Sept. 7, 1965　　　R. J. FLETCHER ETAL　　　3,205,505
VISION-TESTING APPARATUS HAVING ANGULARLY SPACED
VIEWING PATHS FOR VIEWING TWO CONCENTRIC
SERIES OF TESTING CHARTS
Filed June 2, 1960　　　　　　　　　　　　　4 Sheets-Sheet 1
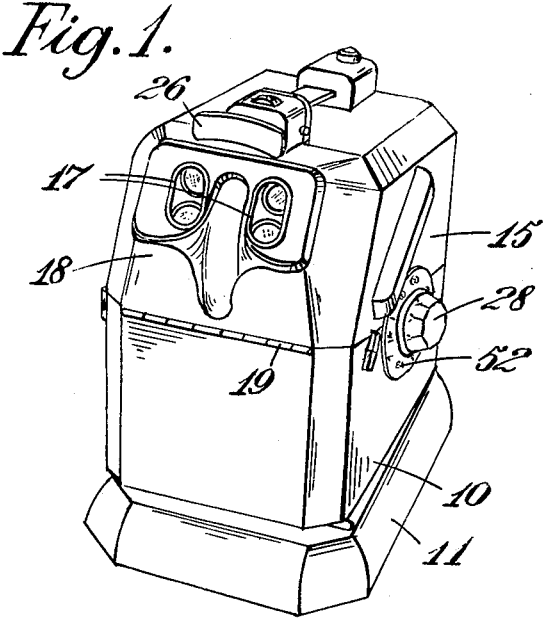
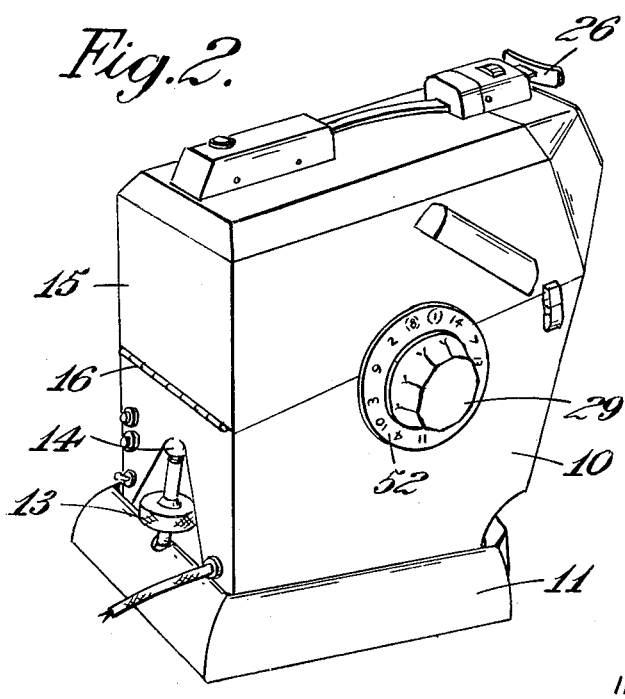
INVENTORS
ROBERT JACKSON FLETCHER
CHARLES JAMES WORTH
GORDON RICHARD SUTHERWOOD
BY Louis L. Gagnon
ATTORNEY INVENTORS
ROBERT JACKSON FLETCHER
CHARLES JAMES WORTH
GORDON RICHARD SUTHERWOOD
BY Louis L. Gagnon
ATTORNEY Sept. 7, 1965  R. J. FLETCHER ETAL  3,205,505
VISION-TESTING APPARATUS HAVING ANGULARLY SPACED
VIEWING PATHS FOR VIEWING TWO CONCENTRIC
SERIES OF TESTING CHARTS
Filed June 2, 1960  4 Sheets-Sheet 3

INVENTORS
ROBERT JACKSON FLETCHER
CHARLES JAMES WORTH
GORDON RICHARD SUTHERWOOD
BY Louis L. Gagnon
ATTORNEY

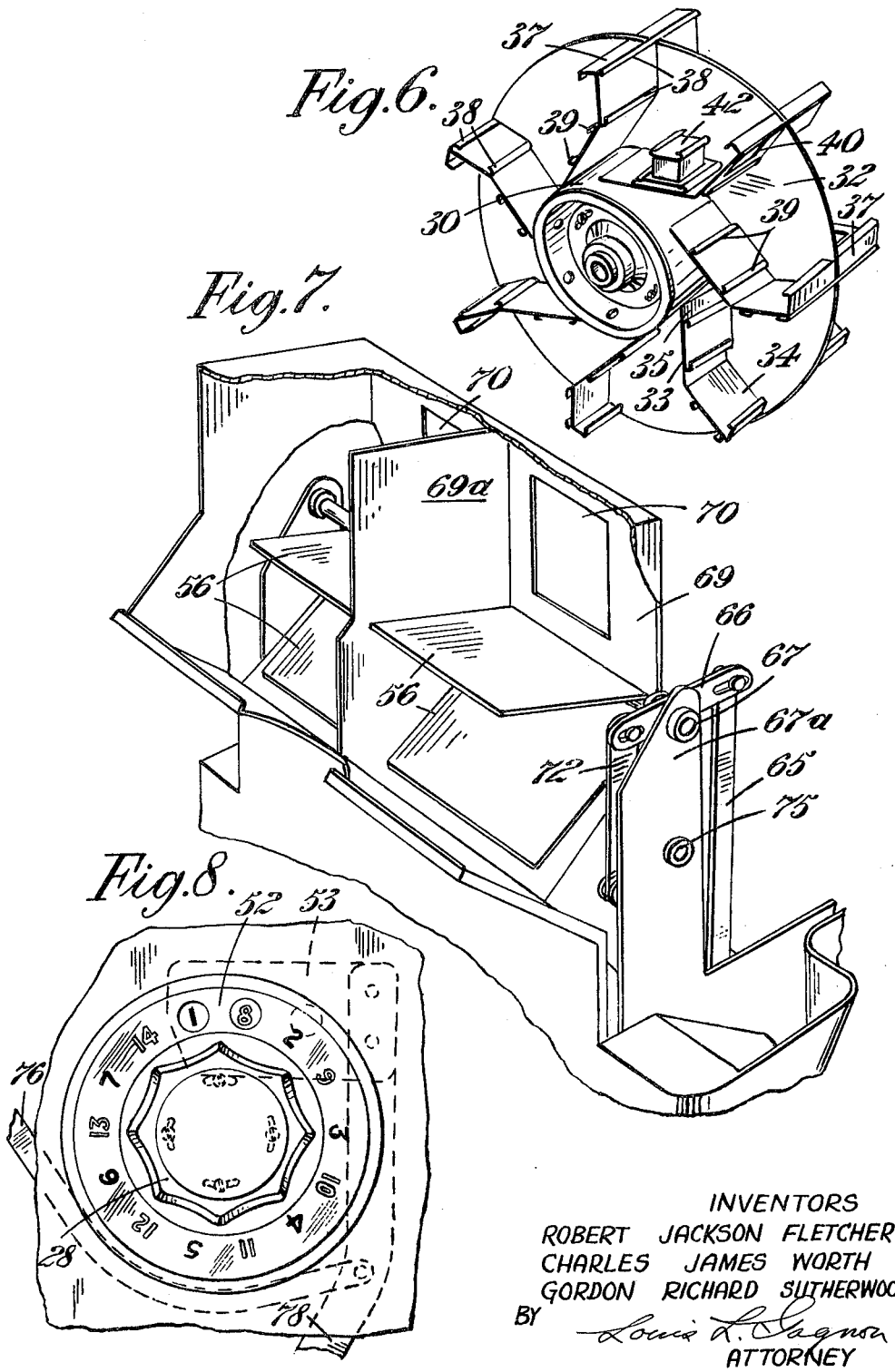

United States Patent Office 3,205,505
Patented Sept. 7, 1965

3,205,505
VISION-TESTING APPARATUS HAVING ANGU-
LARLY SPACED VIEWING PATHS FOR VIEWING
TWO CONCENTRIC SERIES OF TESTING
CHARTS
Robert Jackson Fletcher, Hounslow, and Charles James
Worth and Gordon Richard Sutherwood, London,
England, assignors to American Optical Company,
Southbridge, Mass., a voluntary association of Massa-
chusetts
Filed June 2, 1960, Ser. No. 38,409
Claims priority, application Great Britain, June 5, 1959,
19,392/59
6 Claims. (Cl. 351—32)

This invention is for improvements in or relating to vision-testing apparatus, and has for one of its objects to provide an apparatus which will enable the preliminary checking of a group of subjects to be simply and rapidly carried out so as to ascertain those persons to whom a full professional examination should be a benefit.

According to the invention there is provided vision-testing apparatus comprising a viewing window having associated with it, for alternative use, a distance lens or lenses and a reading lens or lenses operative through angularly separated viewing paths, and a carrier rotatable on a shaft step by step to present a succession of vision-checking cards or the like to both of the viewing paths. Conveniently seven regularly spaced steps are provided in each complete revolution of the carrier, this being about the maximum which can be accommodated in apparatus of reasonable dimensions.

It is preferred to arrange that the vision-checking cards or the like are so arranged that after those to be inspected on the one viewing path have all been presented to the viewer, the continuation of the rotation of the carrier presents other cards or the like successively for viewing through the other viewing path, and a shutter may be provided which obstructs the vision through the distance viewing path when the reading viewing path is to be used, and vice versa. This shutter may, if desired, be carried on a spindle which is connected by linkwork to a wheel intermittently rotated by a Geneva wheel driven from the shaft of the carrier.

In order to facilitate the operation and control of the apparatus, it is convenient to provide an indicator dial, visible at the exterior of the apparatus, and rotating, with the carrier, past a window providing either illumination or white background which identifies a marking on the dial with the vision-checking card or the like then being viewed. The markings appropriate to distance viewing may be alternated with markings appropriate to reading viewing, and a shutter carrying the aforesaid illumination window or white background may be provided which is moved a distance corresponding to the space between two adjacent markings (i.e. one for each viewing path) when a change in the viewing path being used occurs so that the illumination window or white background is transferred from the one set of markings to the other set. The shutter may conveniently be connected by linkwork to a wheel intermittently rotated by a Geneva wheel driven from the shaft of the carrier, as with the shutter referred to above. Indeed the same Geneva wheel may serve for operating both shutters.

Preferably the aforesaid carrier comprises card or like supporting frames of angular formation such that at each step each frame presents cards or the like with their faces respectively at right angles to each of said viewing paths. However, if desired, at one or more steps, a portion of the frame lying in the distance viewing path may not itself carry a vision-checking card or the like but, instead, present an aperture so that a more distant vision-checking card or the like mounted in the apparatus will be visible along the said viewing path. The frame members will usually offer slideways for the reception of the vision-checking cards or the like, but in some circumstances it may be preferred to arrange that one or more frames carry a platform raised above that surface of the frame which is directed to the lens when viewing is taking place, which platform receives a vision-checking card or the like which is thus brought nearer to the lens than would be the case if the card or the like were received in the said slideway.

It is convenient to arrange that the carrier comprises a central cylindrical sheet, on the exterior of which the frames, which are also of sheet material, are supported. The frames may be secured to the cylindrical sheet by reaching through slots in the latter and being bent over on the inner face of the said cylindrical sheet.

Separate distance lenses and separate reading lenses may be provided for each eye of the viewer, and in this case, the frames may carry separate vision-checking cards or the like for each of the view's eyes. Each frame may be in two portions lying one on each side of a central annular sheet which reaches from the exterior of the aforesaid cylindrical sheet out to the extremities of the frames, to separate the viewing paths of the viewer's two eyes. The outer extremities of the frames may have extensions which are bent into correspondence with the curvature of the edge of the aforesaid annular sheet, to restrict the area of the viewing paths.

The viewing window may be accommodated in a hinged hood which overlies another hinged member carrying the lenses, which hinges are so arranged as to permit access to both faces of the window and both faces of the lenses, and this hood may carry a forehead rest reaching out adjustably to determine the position of the viewer's head in relation to the viewing window while using the apparatus.

A locating device may be provided for determining the steps in the rotation of the carrier, which locating device may comprise a spring-pressed ball or the like cooperating with a circularly disposed range of indexing recesses or apertures, and it is convenient to arrange that these indexing apertures are formed in the wall of a cup which is rotatably adjustable about the axis of the carrier.

The apparatus may be enclosed in an external casing, the upper part of which is preferably hinged to the lower part to afford access to the interior. The apparatus also may comprise a base upon which the viewing window, lenses and carrier are hingedly supported, as an entity, in such manner that they can be adjusted about a horizontal axis extending transversely with respect to the viewing paths.

For a more complete understanding of the invention, there will now be described, by way of example only and with reference to the accompanying drawings, one construction of vision-testing apparatus according to the invention. It is to be understood, however, that the invention is not restricted to the precise constructional details set forth.

In these drawings:

FIGURE 1 is a perspective view of the front and one side of the apparatus.

FIGURE 2 is a perspective view of the rear and the other side of the apparatus.

FIGURE 6 is a perspective view of the testing card carrier shown detached from the remainder of the apparatus and on a scale smaller than that of FIGURES 3–5.

FIGURE 7 is a detail perspective view of a shutter mechanism, and

FIGURE 8 is a detail view amplifying part of FIGURE 3.

Like reference numerals indicate like parts throughout the drawings.

Figure 3:
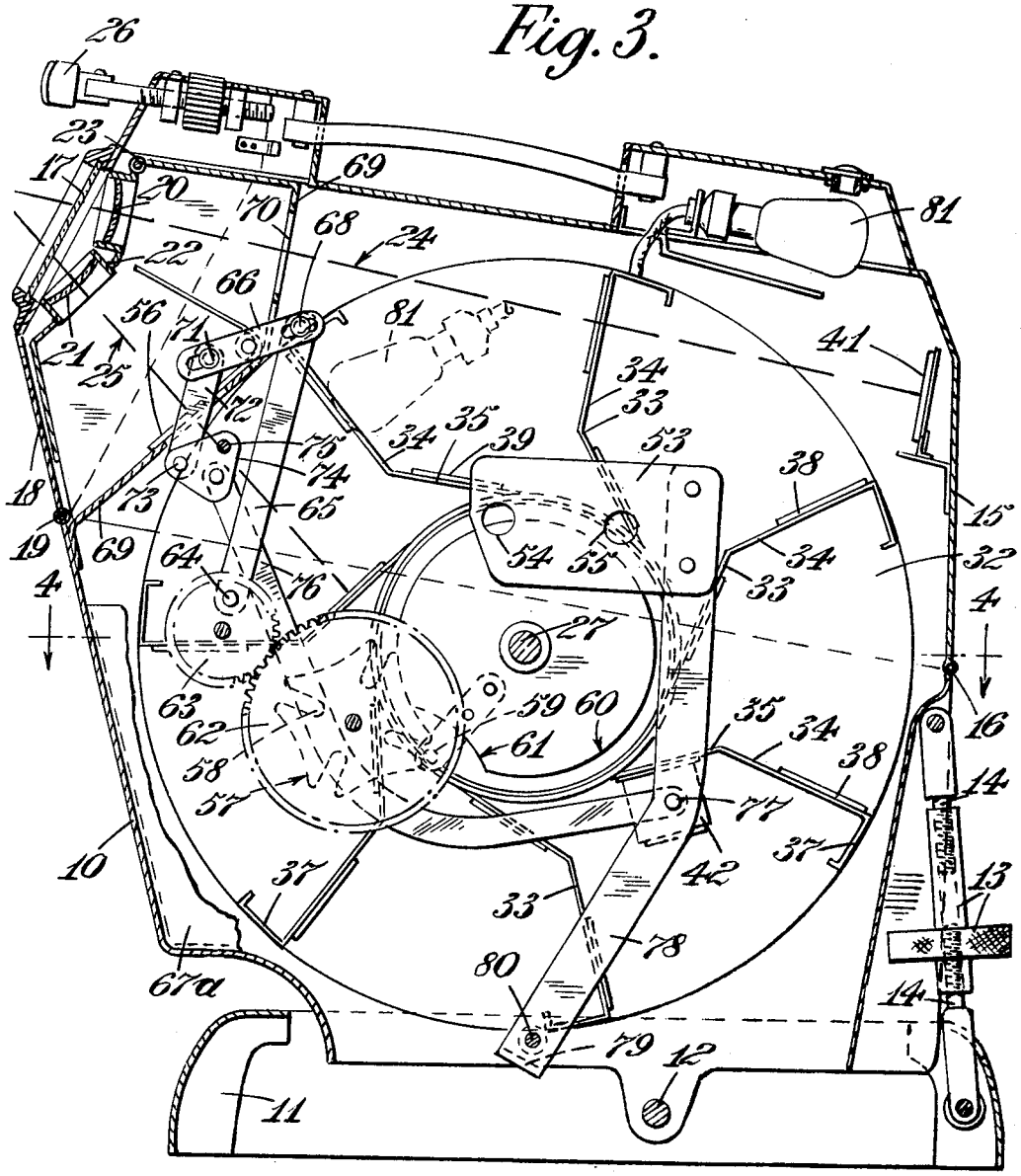
FIGURE 3 is a vertical section through the apparatus on a scale larger than that of FIGURES 1 and 2 and with certain parts broken away for the sake of clearness.

In the construction shown in the drawings, the apparatus comprises a two-part sheet metal casing of which the lower part 10 is hingedly supported at its lower end on a base piece 11 in such manner that it can be tilted about its hinge 12 by adjusting a nut 13 on a screwed two-part rod 14. This will enable the apparatus to be readily adjusted to suit the physique or other attributes (such as for instance the wearing of bifocal spectacles) of the successive viewers. The upper part 15 of the casing is hinged to the lower part 10 on a hinge pin 16 so that it can be swung open to afford access to the interior. The hinge pin 16 is located at a position remote from the viewing window, which latter is located in what may conveniently be called the front of the apparatus and will now be described.

The viewing window 17 (see FIGURE 3) will usually be glazed with flat parallel sided transparent material, which may include filtering arrangements to approximate the illumination to daylight or other required conditions (say to test a driver's vision), and will usually be in two separate portions (see FIGURE 1), one portion for each eye of the viewer. The two parts of the viewing window, one for each eye, are shown elongated in a vertical direction so as to permit the viewer to use both the distance and the reading viewing paths (hereinafter described) without difficulty. The window 17 is carried by a hood 18 which is hinged at its lower edge at 19 on the casing so that it can be swung outwardly and downwardly for cleaning and inspection and to afford access to the lenses 20 and 21 which are housed in another member 22. The hinge 23 of the lens-carrying member 22 is located at its upper end so that it swings in the opposite direction to that in which the aforesaid hood 18 swings. There are four lenses 20 and 21 in the member 22, two for each eye of the viewer. The upper lenses 20 are for distance viewing and the lower lenses 21 are for reading viewing, and the lens carrying member is bent angularly as shown in FIGURE 3 so that the distance viewing path 24 lies at an angle of 35° to the reading viewing path 25, the latter being directed more downwardly. At the upper end of the hood 18 there is provided a forehead rest 26 which can be adjusted towards and away from the viewer to ensure that his eyes are accurately placed in regard to the viewing paths 24 and 25, and, for example if he wears spectacles, to keep the lenses clear of the apparatus.

In the casing part 10 there is horizontally supported a carrier shaft 27 which at the outside of the casing is fitted with knobs 28 and 29 for the manual rotation of the testing card carrier. This carrier comprises two central cylinders 30 and 31, preferably made of thin metal and each closed at one end and riveted in place one on each side of a sheet 32. From its cylindrical exterior there extend outwardly seven frames 33 which are equally spaced and are intended to carry separate vision-checking cards or the like for presentation to each of the viewer's eyes in each of the distance and reading viewing paths 24 and 25. Each frame 33 is in two portions lying one on each side of the aforesaid sheet 32 which is annular and serves to support the frames 33 and also to separate from each other the parts of the viewing paths 24 and 25 for the right and left eyes. Each frame portion has two main parts 34 and 35 which are angularly disposed, being separated by an obtuse angle of 137° 52′, and these two parts are intended to receive the vision-checking cards or the like, and in due course to bring them into the distance viewing path 24 or the reading viewing path 25, at right angles thereto.

Figure 4:
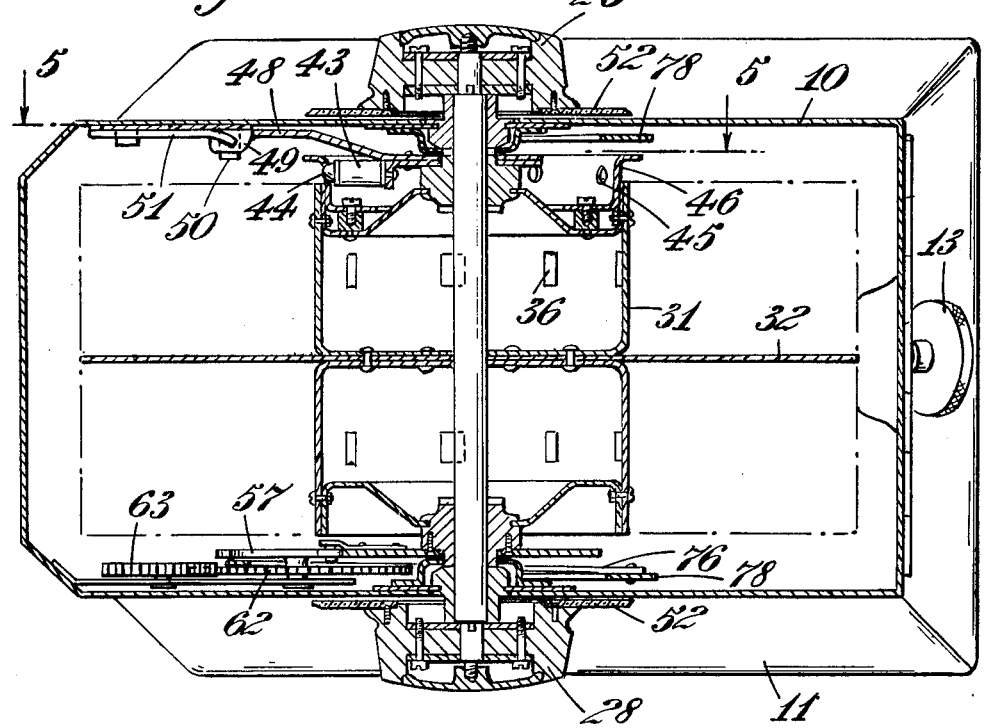
FIGURE 4 is a horizontal section on the line 4—4 of FIGURE 3.

One end of each frame portion has a tab 36 which reaches through a slit in the central cylinder 30, 31 and is bent over to constitute an anchorage (see FIGURE 4). One side of each frame portion abuts the central annular sheet 32 (see FIGURE 6) and the extremity of each sheet portion is bent at 37 into conformity with the circular periphery of the annular sheet to restrict the area of the viewing paths. Separately formed slideways 38 and 39 of sheet metal are attached to each of the frames 33 to receive the vision-checking cards or the like, these slideways reaching through slits in the central annular sheet 32 so as to secure the frames in place. It will be appreciated that the relative angular disposition of the slideways 38 and 39 is such as to present the cards or the like carried by them at right angles to the respective viewing paths 24 and 25.

It is convenient to arrange that for the distance viewing path there is 200 mm. distance between the lens 20 and the vision-checking card or the like and that for the reading viewing path the corresponding distance is 166.6 mm. Small tolerances are permissible in relation to these distances.

On some of the frame portions, slideways in the distance viewing path 24 may be replaced by the formation of an aperture 40 (see FIGURE 6) which will permit the viewing path to extend through the frame portion on to a vision-checking card or the like 41 (see FIGURE 3) which may conveniently be arranged 133.3 mm. further away from the distance viewing lens 20. Moreover, one or more of the slideways for the reading viewing path 25 may be replaced by platforms 42 (see FIGURES 3 and 6) to carry vision-checking cards or the like at a location nearer to the reading viewing lens 21 than the vision-checking card or the like would be if it were directly upon the frame portion 35.

Figure 5:
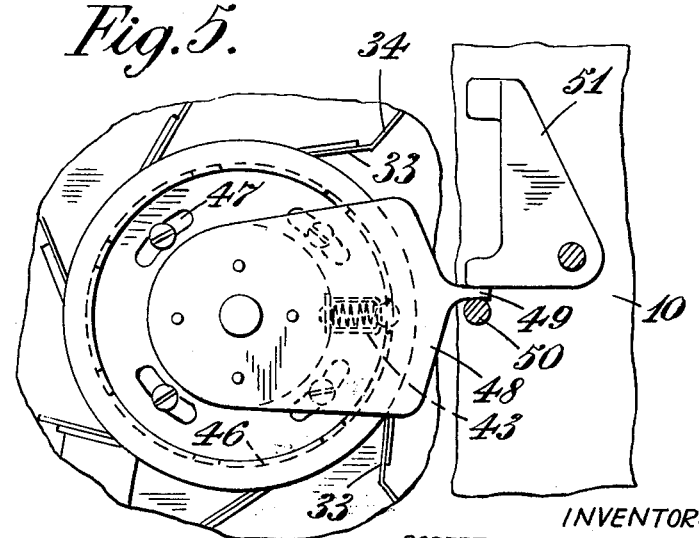
FIGURE 5 is a detail sectional view on the line 5—5 of FIGURE 4.

There are seven steps regularly spaced in a complete rotation of the testing card carrier and to ensure that the carrier is properly situated in each step, a locating device is provided. This takes the form of a case 43 (see FIGURES 4 and 5) carrying a spring-pressed ball 44 to co-operate with a circular series of recesses 45 formed in the side of a cup 46 carried by the cylinder 31. Slots 47 in the base of the cup 46 permit it to be adjusted in setting in relation to the cylinder 31. The case 43 is mounted on an arm 48 which has a projection 49 arranged to be held against a stationary stop 50 on the casing by a safety catch 51 to prevent undesired rotation of the arm 48.

Each of the manual turning knobs 28 and 29 for the carrier carries a sheet 52 of transparent material, such as that sold under the registered trademark "Perspex," which bears a series of markings or graduations. The markings are in two sets alternating with each other, one set corresponding with the seven successive steps for the distance viewing path 24 and the other corresponding with the seven successive steps for the reading viewing path 25. To ensure that the person controlling the operation knows which step is in use at any time, electric lamps may be arranged in the interior of the casing to shine through a perforation in a shutter 53 (see FIGURES 3 and 8), at each side of the casing, so as to direct a spot of light on to the appropriate marking on the aforesaid transparent material sheet 52 or alternatively, indicating discs are attached to the shutter 53 to provide background, preferably white, to the appropriate marking. Two such perforations or discs are shown at 54 and 55 in FIGURE 3. When the viewer is directed to change from the one viewing path to the other, this shutter 53 is automatically moved sufficiently to direct the spot of light or the white background on to the markings of the new viewing path.

Similarly a composite shutter 56 (see FIGURES 3 and 7) which precludes the viewer from using the wrong viewing path is automatically brought into the appropriate masking position.

The two shutters 53 and 56 just mentioned are driven through a Geneva wheel 57 from the shaft 27 of the carrier (see FIGURE 3). The Geneva wheel has the usual four equally spaced radial slots 58 to be engaged by a pin 59 rotating with the carrier, so that each rotation of the carrier will move the Geneva wheel through one quarter of a revolution. A circular portion of a member 60 on the carrier engages a corresponding concave curve on the periphery of the Geneva wheel to preclude movement of the latter except when the pin 59 is engaged in a radial slot 58. At this position of the parts the member 60 is cut away at 61 to release the Geneva wheel. The Geneva wheel includes a toothed wheel 62 meshing with a subsidiary toothed wheel 63, to operate the aforesaid shutters for the vision path indicator and for the viewing paths. The subsidiary wheel 63 carries a pin 64 which is connected by a link 65 to a lever 66 fixedly mounted on the hinge pin 67 of the composite shutter 56 to swing the latter once in every half revolution of the wheel 63 (i.e. once in every revolution of the carrier), so as to effect masking of the viewing path 24 or 25 which is not to be used. The pivot 67 is carried by a stationary plate 67a. There is a pin-and-slot connection at 68 between the link 65 and the lever 66 to afford appropriate movement accommodation. An angled partition 69 with a central division 69a (see FIGURE 7) inside the casing is appropriately perforated, as at 70, to permit viewing, and one or the other of these perforations 70 is masked by one or other of the wings of the shutter 56.

One arm of the lever 66 is connected to the link 65 as just described. The other arm of that lever is coupled by a pin-and-slot connection 71 to one end of a link 72, the other end of which is pivoted at 73 to a triangular plate 74. This plate swivels about a stationary pivot 75 carried by the aforesaid plate 67a and is also connected to a link 76 which curves round to be pivoted at 77 to a lever 78. This lever 78, and a corresponding one at the other side of the apparatus, are interconnected by a crossbar 79 located below the pivotal axis 80, in the casing, for the levers 78. Thus the levers 78, which carry the aforesaid shutters 53, will be rocked synchronously to move the shutters 53 more or less horizontally between two different indication points.

Illumination of the interior of the apparatus is effected by lamps 81.

From the foregoing, it will be seen that the rotation of the manual knobs 28 and 29 on the carrier automatically brings each vision-checking card or the like into the view of the person being tested. At suitable places in the sequence, cards are included giving instructions to the user to change the direction of view say, from the distance viewing path 24 to the reading viewing path 25. During the distance viewing, the lower perforations 70 are masked by the shutter 56, but this shutter moves automatically to mask the upper perforations 70 as the first reading vision-checking card or the like comes into the view of the person being tested. The number of the vision-testing card or the like being presented to the person under test is indicated at the side of the apparatus.

A total of fourteen tests may be made in the correct sequence without the viewer having to move from the apparatus. The first seven tests may be for distance viewing, the seventh card or the like may give instructions to the viewer to look down through the lower part of the viewing window, and as the first card or the like for reading viewing comes into view the shutter 56 operates automatically to mask the distance viewing path 24. The last seven vision-testing cards or the like are then proceeded with to deal with reading vision.

The choice of the vision-testing cards or the like will depend upon the circumstances. Some suitable functions are as follows:

Distance visual acuity for right eye and left eye.
Acuity under conditions of fogging for each eye separately.
Vertical heterophoria for distance.
Lateral heterophoria for distance.
Stereopsis for distance.
Near visual acuity for each eye separately at 33 cms.
Vertical heterophoria for near vision.
Lateral heterophoria for near vision.
Efficiency of near correction or amplitude of accommodation for 20 cms.
Binocular near acuity and simultaneous binocular vision.
Stereopsis for near vision.

We claim:
1. Vision-testing apparatus comprising a housing having a viewing opening therein, a pair of distance lenses, a pair of reading lenses, means mounting said lenses relative to said viewing opening for defining angularly-separated distance and reading viewing paths extending into the housing, a vision-checking card fixedly mounted within the housing to be viewed along said distance viewing path, a plurality of substantially identical frames each embodying a pair of angularly-disposed frame sections, one of said frames having an aperture in one section thereof, a plurality of vision-checking cards mounted on respective frame sections other than said apertured frame section, a single carrier supporting said frames in substantially radially-extending relation thereon so that corresponding frame sections are disposed in circumferentially-spaced relation to each other in inner and outer concentric series around the carrier with said apertured frame section in said outer series, means mounting the carrier for rotation within the housing to successively present the frame sections of said inner series within said reading viewing path in spaced relation to said reading lenses so that cards mounted on said frame sections can be viewed at dispositions normal to said path and to successively present the frame sections of said outer series within said distance viewing path so that cards mounted on said frame sections can be viewed at dispositions normal to said path, the frame sections of said outer series being presented within the distance viewing path between said distance lenses and said fixedly mounted vision-checking card for permitting viewing of said fixedly mounted card through said apertured frame section.

2. Vision-testing apparatus as set forth in claim 1 wherein slideways are mounted upon said frame sections for mounting said vision-checking cards thereon, said apparatus including a platform means adapted to be selectively mounted in a slideway on a frame section of said inner series, said platform means being adapted to support a vision-checking card within said reading path at a disposition normal to said path so that said card can be disposed in more closely spaced relation to said reading lenses than the other cards mounted on frame sections of said inner series.

3. Vision-testing apparatus comprising a housing having a viewing opening therein, a pair of distance lenses, a pair of reading lenses, means mounting said lenses relative to said viewing opening for defining angularly-separated distance and reading viewing paths extending into the housing, a plurality of substantially-identical frames each embodying a pair of angularly-disposed frame sections, a plurality of vision-checking cards mounted on respective sections of said frames, a single carrier supporting said frames in substantially radially-extending relation thereon so that the vision-checking cards mounted on corresponding frame sections are disposed in circumferentially-spaced relation to each other in two concentric series around the carrier, means mounting the carrier for rotation within the housing to successively present the cards of each of said series to be viewed along respective viewing paths at dispositions normal to said paths, shutter means mounted within said housing for movement between positions masking respective viewing paths, and a Geneva mechanism actuable by rotation of said carrier adapted to move said shutter means between said masking positions after each complete revolution of the carrier.

4. Vision-testing apparatus comprising a housing having a viewing opening therein, a pair of distance lenses, a pair of reading lenses, means mounting said lenses relative to said viewing opening for defining angularly-separated distance and reading viewing paths extending into the housing, a plurality of substantially identical frames each embodying a pair of angularly-disposed frame sections, a plurality of vision-checking cards mounted on respective sections of said frames, a single carrier supporting said frames in substantially radially-extending relation thereon so that the cards mounted on corresponding frame sections are disposed in circumferentially-spaced relation to each other in two concentric series around the carrier, means mounting the carrier for rotation within the housing to present a selected card of each of said series to be simultaneously viewed along respective viewing paths at dispositions normal to said paths, shutter means mounted within said housing for movement between positions masking respective viewing paths, a dial mounted exteriorly of the housing adapted to rotate with said carrier, said dial having markings corresponding to respective vision-checking cards of each of said series in alternate circumferentially-spaced relation thereon, indicating means mounted in one position to indicate the dial marking corresponding to the vision-checking card of one of said series which is presented to view as the dial and said carrier are rotated, said indicator being mounted for movement to a second position to indicate the dial marking corresponding to the vision-checking card of the other of said series which is presented to view as the dial and said carrier are rotated, and a Geneva mechanism actuable by rotation of said carrier adapted to move said shutter means between said masking positions and to move said indicating positions after each complete revolution of said carrier.

5. Vision-testing apparatus comprising means defining straight, angularly-separated distance and reading viewing paths, a plurality of substantially identical frames each embodying a pair of angularly disposed frame sections, a plurality of vision-checking means mounted on respective sections of said frames and a single carrier supporting said frames in substantially radially-extending relation thereon so that corresponding frame sections are disposed in circumferentially-spaced relation to each other around said carrier, one section from each of said frames being arranged in an inner concentric series around the carrier and the other frame sections being arranged in an outer concentric series around said inner series, said carrier being mounted for rotation to present the vision-checking means mounted on each of said inner and outer series of frame sections to be successively viewed along respective viewing paths at dispositions normal to said paths.

6. Vision-testing apparatus comprising a pair of distance lenses, a pair of reading lenses, means supporting said lenses for defining straight, angularly-separated distance and reading viewing paths, a plurality of substantially identical frames each embodying a pair of angularly-disposed frame sections, said sections of each frame including an interior angle therebetween which is supplementary to the angle separating said viewing paths, a plurality of vision-checking means mounted on respective sections of said frames, and a single carrier supporting said frames in substantially radially-extending relation thereon so that the corresponding frame sections are disposed in circumferentially-spaced relation to each other around said carrier, one section from each of said frames being arranged in an inner concentric series around the carrier, and the other of said frame sections being arranged in an outer concentric series around said inner series, said carrier being mounted for rotation to present the vision-checking means mounted on each of said inner and outer series of frame sections to be successively viewed only along respective viewing paths and at dispositions normal to said paths.

References Cited by the Examiner
UNITED STATES PATENTS

| | | | |
|---|---|---|---|
| 656,499 | 8/00 | Boden | 88—31 |
| 1,074,316 | 9/13 | Dragits | 88—31 |
| 2,364,793 | 12/44 | Jobe et al. | 88—20 |
| 2,481,582 | 9/49 | Ellis | 88—20 |
| 2,485,272 | 10/49 | Freeman | 88—20 |
| 2,798,408 | 7/57 | Ellis et al. | 88—20 |
| 2,893,288 | 7/59 | Sheridan | 88—20 X |
| 3,012,472 | 12/61 | Feinberg et al. | 88—20 |

JEWELL H. PEDERSEN, *Primary Examiner.*

EMILE G. ANDERSON, *Examiner.*